(12) United States Patent
Kaippallimalil

(10) Patent No.: US 8,509,440 B2
(45) Date of Patent: Aug. 13, 2013

(54) PANA FOR ROAMING WI-FI ACCESS IN FIXED NETWORK ARCHITECTURES

(75) Inventor: John Kaippallimalil, Richardson, TX (US)

(73) Assignee: Futurwei Technologies, Inc., Plano, TX (US)

( * ) Notice: Subject to any disclaimer, the term of this patent is extended or adjusted under 35 U.S.C. 154(b) by 1382 days.

(21) Appl. No.: 12/192,486

(22) Filed: Aug. 15, 2008

(65) Prior Publication Data

US 2009/0055898 A1 Feb. 26, 2009

Related U.S. Application Data

(60) Provisional application No. 60/957,737, filed on Aug. 24, 2007.

(51) Int. Cl.
*H04K 1/00* (2006.01)

(52) U.S. Cl.
USPC ........... 380/270; 380/247; 380/248; 380/249; 380/250; 380/255; 380/256; 380/257; 380/258; 380/259; 380/260; 380/261; 380/262; 380/263; 380/264; 380/265; 380/266; 380/267; 380/268; 380/269; 713/155; 713/156; 713/157; 713/158; 713/159; 713/168; 705/67

(58) Field of Classification Search
USPC ................. 726/3; 380/247–250, 255–270; 713/155–159, 168; 705/67
See application file for complete search history.

(56) References Cited

U.S. PATENT DOCUMENTS

| | | | | |
|---|---|---|---|---|
| 7,079,499 B1 * | 7/2006 | Akhtar et al. | ................. | 370/310 |
| 7,738,452 B1 * | 6/2010 | O'Rourke et al. | ............ | 370/389 |
| 7,860,978 B2 * | 12/2010 | Oba et al. | ....................... | 709/227 |
| 2003/0093691 A1 * | 5/2003 | Simon et al. | ................... | 713/201 |
| 2005/0081036 A1 * | 4/2005 | Hsu | ............................... | 713/171 |
| 2005/0102410 A1 * | 5/2005 | Tuomi | ........................... | 709/229 |

(Continued)

FOREIGN PATENT DOCUMENTS

| | | |
|---|---|---|
| EP | 1439667 A2 | 7/2004 |
| WO | 2006017133 A2 | 2/2006 |

OTHER PUBLICATIONS

Aboba, Bernard. "Extensible Authentication Protocol (EAP) Key Management Framework", EAP Working Group Internet-Draft (Work in Progress), Nov. 14, 2004, [Retrieved from Internet Oct. 3, 2011], "http://tools.ietf.org/pdf/draft-ietf-eap-keying-22.pdf".*

(Continued)

*Primary Examiner* — Edan Orgad
*Assistant Examiner* — Roderick Tolentino
(74) *Attorney, Agent, or Firm* — Conley Rose, P.C.; Grant Rodolph; Brandt Howell

(57) ABSTRACT

A network component comprising at least one processor configured to implement a method comprising deriving a Master Session Key (MSK) using a secret key and at least one parameter obtained from an Extensible Authentication Protocol (EAP) sequence, deriving a first Pairwise Master Key (PMK) and a second PMK from the MSK, authenticating with a home gateway (HG) using the first PMK, and authenticating with an end point using the second PMK. Included is an apparatus comprising a node comprising an access controller (AC) and a protocol for carrying authentication for network access (PANA) Authentication Agent (PAA), wherein the AC is configured to manage authentication for a UE, and wherein the PAA is configured to implement a PANA to forward authentication information related to the UE.

14 Claims, 4 Drawing Sheets

(56) References Cited

U.S. PATENT DOCUMENTS

| | | | | |
|---|---|---|---|---|
| 2005/0254653 | A1* | 11/2005 | Potashnik et al. | 380/270 |
| 2006/0002330 | A1* | 1/2006 | Madour | 370/328 |
| 2006/0002351 | A1* | 1/2006 | Madour | 370/338 |
| 2006/0036733 | A1 | 2/2006 | Fujimoto et al. | |
| 2007/0016780 | A1* | 1/2007 | Lee et al. | 713/171 |
| 2007/0086382 | A1* | 4/2007 | Narayanan et al. | 370/331 |
| 2007/0121947 | A1* | 5/2007 | Sood et al. | 380/277 |
| 2008/0072047 | A1* | 3/2008 | Sarikaya et al. | 713/171 |
| 2008/0313455 | A1* | 12/2008 | Kroeselberg | 713/153 |
| 2011/0252230 | A1* | 10/2011 | Segre et al. | 713/155 |

OTHER PUBLICATIONS

Sridhar, T., "Wireless LAN Switches—Functions and Deployment", The Internet Protocol Journal, vol. 9, No. 3, Sep. 2006, [Retrieved from the Internet Oct. 3, 2011], "http://www.cisco.com/web/about/ac123/ac147/archived_issues/ipj_9-3/ipj_9-3.pdf".*

ITU-T, "Series G: Transmission Systems and Media, Digital Systems and Networks, Digital Sections and Digital Line System—Optical Line Systems for Local and Access Networks, ONT Management and Control Interface Specifications for B-PON System with Protection Features," Telecommunication Standardization Sector of ITU, G.983.6, Jun. 2002, 22 pages B. O'Hara, et al., "Configuration and Provisioning for Wireless Access Points (CAPWAP)", Network Working Group RFC 3990, Feb. 2005, 5 pages.

3rd Generation Partnership Project, 3GPP TS 23.234 V7.1.0, "3rd Generation Partnership Project; Technical Specification Group Services and System Aspects; 3GPP System to Wireless Local Area Network (WLAN) Interworking, System Description (Release 7)," Mar. 2006, 81 pages.

Morand, Lionel, et al., "Home Gateway and Nomad Authentication," Home Gateway Initiative, France Telecom, May 2007, 12 pages.

Foreign Communication From a Related Counterpart Application—International Search Report and Written Opinion, PCT/CN2008/072098, Nov. 13, 2008, 13 pages.

Foreign Communication From a Related Counterpart Application, Chinese Application 200880017426.0, Chinese Office Action dated Mar. 9, 2011, 4 pages.

Foreign Communication From a Related Counterpart Application, Chinese Application 200880017426.0, Partial English Translation of Chinese Office Action dated Mar. 9, 2011, 3 pages.

Jacobsen, O., Ed., et al., "The Internet Protocol Journal," vol. 9, No. 9, Sep. 2006, 36 pages.

Zorn, G., "Microsoft Vendor-specific RADIUS Attributes," RFC 2548, Mar. 1999, 42 pages.

Foreign Communication From a Related Counterpart Application, Chinese Application 200880017426.0, Chinese Office Action dated Mar. 12, 2012, 5 pages.

Foreign Communication From a Related Counterpart Application, Chinese Application 200880017426.0, Partial Translation of Chinese Office Action dated Mar. 12, 2012, 4 pages.

Foreign Communication From a Related Counterpart Application, Chinese Application 200880017426.0, Chinese Office Action dated Sep. 13, 2012, 7 pages.

Foreign Communication From a Related Counterpart Application, Chinese Application 200880017426.0, Partial Translation of Chinese Office Action dated Sep. 13, 2012, 3 pages.

\* cited by examiner

PANA FOR ROAMING WI-FI ACCESS IN FIXED NETWORK ARCHITECTURES

CROSS-REFERENCE TO RELATED APPLICATIONS

The present application claims priority to U.S. Provisional Patent Application Ser. No. 60/957,737 filed Aug. 24, 2007 by John Kaippallimalil and entitled "PANA for Roaming Wi-Fi Access in Fixed Network Architectures," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In fixed communication networks, such as Internet Protocol (IP) networks, roaming or wireless access may be provided for mobile users via wireless technologies, such as Wi-Fi. Many mechanisms for providing roaming access to an IP network for a mobile user equipment (UE) are being explored. Some mechanisms may establish wireless communications between the UE and a local or home network via a home gateway (HG), which may be a residential subscriber. As such, the UE initially establishes "trust" with the HG, and hence the HG communicates with the IP network and forward communications between the UE and the IP network. However, when the UE trusts the HG, the UE communications with the IP network may be intercepted at the HG or at the home network.

Further, the HG may be in charge of controlling the communications, such as setting policies and quality of service (QoS), and accounting for the communications, such as charging for connection or time usage. However in some cases, for instance when the HG is not owned by the IP network service provider, charging the HG with controlling and accounting for communications may not be desired or beneficial to the IP network service provider.

SUMMARY

In one embodiment, the disclosure includes a network component comprising at least one processor configured to implement a method comprising deriving a Master Session Key (MSK) using a secret key and at least one parameter obtained from an Extensible Authentication Protocol (EAP) sequence, deriving a first Pairwise Master Key (PMK) and a second PMK from the MSK, authenticating with a HG using the first PMK, and authenticating with an end point using the second PMK.

In another embodiment, the disclosure includes an apparatus comprising a node comprising an access controller (AC) and a protocol for carrying authentication for network access (PANA) Authentication Agent (PAA), wherein the AC is configured to manage authentication for a UE, and wherein the PAA is configured to implement a PANA to forward authentication information related to the UE.

In yet another embodiment, the disclosure includes a method comprising receiving an MSK, deriving a first PMK and a second PMK from the MSK, sending the first PMK to an HG, and sending the second PMK to an end point.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for providing a UE roaming access to a fixed network, such as an IP network. To provide roaming access, the UE may communicate using a wireless link with a HG, which may be located at a home network. The HG may be coupled to an access provider network comprising an IP Edge, which may be in communications with the IP network. Hence, the HG may forward communications between the UE and the IP network via the IP Edge. Specifically, the HG may communicate with the UE using a secure wireless link channel, which may be established using a protocol for carrying authentication for network access (PANA), and a first shared key. Additionally, the HG may communicate with the IP Edge using a first tunnel. The UE may communicate with the IP Edge via the HG without trusting the HG using a secure second tunnel and a second shared key. Hence, the UE may establish roaming access to the IP network using the secure second tunnel without trusting the HG with its communications. Such a configuration may also allow the IP Edge to control or police the communications of the second tunnel, which may be accounted for by an AAA server.

Figure 1:
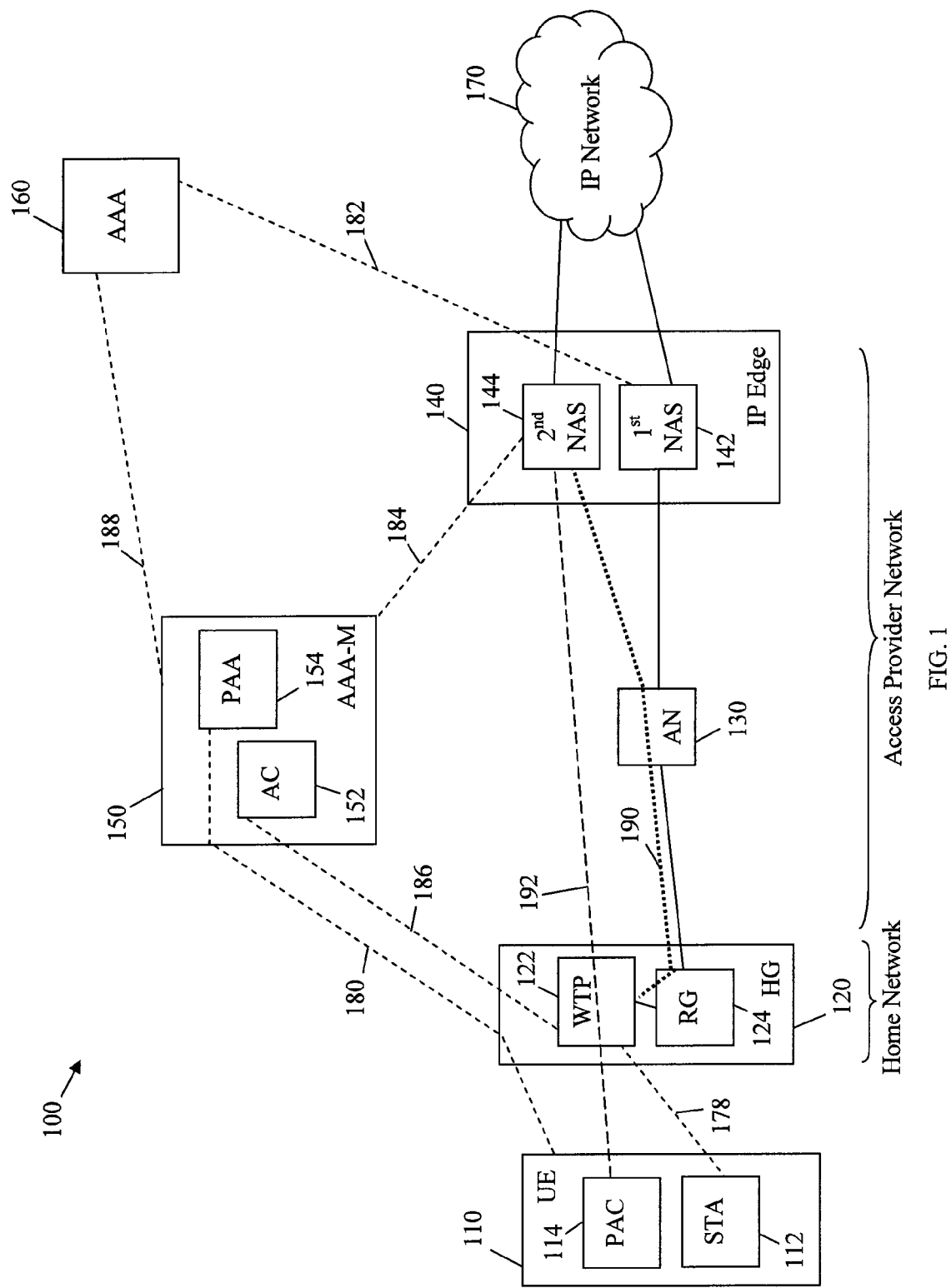
FIG. 1 is a schematic diagram of an embodiment of a fixed network roaming access system.

FIG. 1 illustrates one embodiment of a fixed network roaming access system 100. The fixed network roaming access system 100 may comprise at least one UE 110, a HG 120, an access node (AN) 130, an IP Edge 140, an AAA mediator (AAA-M) 150, an AAA server 160, and an IP network 170. In an embodiment, the HG 120 may be a home network or part of a home network, which may coupled to an access provider network comprising the AN 130 and the IP Edge 140. In turn, the access provider network may be coupled to the IP network 170 via the IP Edge 140. In some embodiments, the access provider network may also comprise the AAA-M 150.

In an embodiment, the UE 110 may be any user mobile device, component, or apparatus that communicates wirelessly with the HG 120. For example, the UE 110 may be a cellular phone, a personal digital assistant (PDA), a portable computer, or any other wireless device. The UE 110 may comprise a station (STA) 112 and a PANA authentication client (PAC) 114. The STA 112 and the PAC 114 may be integrated into a single device or component. Alternatively, the STA 112 and the PAC 114 may be two separate devices or components that communicate with each other. The STA 112 may be configured to communicate with the HG 120 using a wireless link 178. For instance, the UE 110 may comprise an infrared port, a Bluetooth interface, an IEEE 802.11 compliant wireless interface, or any other wireless communication system that enables the UE 110 to communicate wirelessly with the HG 120. In an embodiment, the wireless link 178 may be an IEEE 802.11 link or a Wi-Fi link. In other embodiments, the wireless link 178 may be a Bluetooth link, a Worldwide Interoperability for Microwave Access (WiMAX) link, a near field communication (NFC) link, an Infrared Data Association (IrDa) link, or any other communication link established using wireless technology. The PAC 114 may be configured to communicate with the AAA-M 150, via the HG 120, and exchange authentication information with the AAA-M 150 using PANA. Specifically, the authentication information may be exchanged between the PAC 114 at the UE 110 and the AAA-M 150 via a session flow 180 and using PANA.

In an embodiment, the HG 120 may be any device, component, or network configured to allow the UE 110 to gain wireless access to the home network or to the access provider network. Specifically, the HG 120 may comprise a wireless termination point (WTP) 122 coupled to a router or residential gateway (RG) 124. The WTP 122 may be any device, component, or network configured to establish a wireless link with the STA 112 at the UE 110 and forward communications between the UE 110 and another component, such as the RG 124. In an embodiment, the WTP 122 may be a fixed device that communicates with the UE 110 via the wireless link 178 and with the RG 124 via a fixed link, such as an Ethernet link. The WTP 122 may also be configured to forward authentication information between the UE 110 and the AAA-M 150. The authentication information may be required for establishing authentication between the UE 110 and the HG 120.

The RG 124 may be any device, component, or network that allows the UE 110 to communicate with the IP Edge 140. For example, the RG 124 may be an IP router, such as a customer premises equipment (CPE) router or any router equipment located at a subscriber's premises and that communicates with a network. For instance, the RG 124 may be a DSL modem, a cable modem, or a set-top box. In another embodiment, the RG 124 may be a node that forwards IPv4 and/or IPv6 packets to and from the UE 110.

The RG 124 may exchange communications with the UE 110 via the fixed link between the WTP 122 and the RG 124 and the wireless link 178 between the WTP 122 and the UE 110. Additionally, the RG 124 may exchange communications with the IP Edge 140 using a tunnel 190, which may be established between the HG 120 and the IP Edge 140 via the AN 130. For instance, the tunnel 190 may be a Wi-Fi roaming virtual local access network (VLAN) that may be established between the WTP 122, the RG 124, the AN 130, and the IP Edge 140. The tunnel 190 may be used to forward network setup information, such as IP address request and allocation, between the UE 110 to the IP Edge 140.

In an embodiment, the AN 130 may be any device that transports communications between the HG 120 and the IP Edge 140. For example, the AN 130 may be a switch, a router, or a bridge, such as a Provider Edge Bridge (PEB) or a Provider Core Bridge (PCB). The AN 130 may be located at the access provider network and may be coupled to the HG 120 and the IP Edge 140 via fixed links, such as Ethernet links. Additionally, the AN 130 may communicate with the HG 120 and the IP Edge 140 using the tunnel 190.

In an embodiment, the IP Edge 140 may be any device that forwards communications between the HG 120 and the IP network 170. For example, the IP Edge 140 may be a Broadband Routed Access Server (BRAS) as defined by the broadband Forum or a Cable Modem Termination Server (CMTS). The IP Edge 140 may comprise a first network access server (NAS) 142 and a second NAS 144. The first NAS 142 and the second NAS 144 may comprise bridges, switches, routers, or combinations thereof. In some embodiments, the first NAS 142 and the second NAS 144 may be combined into one component such as a bridge or a router. For example, the first NAS 142, the second NAS 144, or both may be a Back Bone Edge Bridge (BEB), a PEB, a PCB, or a user network interfaces (UNI). Alternatively, the first NAS 142, the second NAS 144, or both may be a point-oriented wire-line node, such as a Digital Subscriber Line (DSL) connection or a provider network edge device.

The first NAS 142 may be coupled to the RG 124, via the AN 130, and to the IP network 170 via fixed links. The first NAS 142 may forward communications between the IP network 170 and the home network or the access provider network using the fixed links. Additionally, the first NAS 142 may exchange authentication information related to a home network component or an access provider network component with the AAA server 160. The authentication information may be exchanged using a session flow 182, which may be established using Remote Authentication Dial In User Service (RADIUS) protocol. The DIAMETER protocol may be used in place of any RADIUS protocol implementation described herein.

The second NAS 144 may also be coupled to the IP network 170 via a fixed link, and may exchange authentication information with the AAA-M 150 using a session flow 184, which may be established using RADIUS or DIAMETER. Additionally, the second NAS 144 may communicate with the PAC 114 at the UE 110 using a secure tunnel 192 without trusting the HG 120. The secure tunnel 192 may be established after authenticating the UE 110 and allocating an IP address for the UE 110. For instance, the secure tunnel 192 may be an Internet Protocol Security (Ipsec) that uses Internet Key Exchange (IKE) to establish a secure session flow between the UE 110 and the second NAS 144.

In some embodiments, the fixed network roaming access system 100 may comprise a plurality of UEs 110 that communicate with the second NAS 144 using a plurality of secure tunnels 192 corresponding to each UE 110. In other embodiments, the IP Edge 140 may comprise a plurality of second NASs 144 that communicate one on one with a plurality of UEs 110 using a plurality of secure tunnels 192.

In an embodiment, the AAA-M 150 may be any device, component, or server that manages the UE 110 access to the home network and the access provider network at the HG 120, and to the IP network 170 at the IP Edge 140. The AAA-M 150 may comprise an AC 152 and a PANA Authentication Agent (PAA) 154. The AC 152 may be configured to manage authentication of the UE 110. For instance, the AC 152 may exchange authentication information with the UE 110, via the WTP 122, using a Control and Provisioning of Wireless Access Points (CAPWAP) protocol. The authentication information may be exchanged between the UE 110 and the WTP 122 via the wireless link 178 and between the WTP 122 and the AC 152 via a session flow 186 using CAPWAP. In other embodiments, the AC 152 may exchange the authentication information using any other suitable management protocol. For example, the AC 152 may be coupled to the WTP 122 via a DSL link and may manage the forwarded authentication information using a Broadband Forum technical report 069 (TR-069) protocol. Alternatively, the AC 152 may be coupled to the WTP 122 via an optical link and may manage the UE 110 access using an optical network terminal management and control interface (OMCI) protocol or an OMCI layer-two connection protocol (OMCI/L2CP).

In an embodiment, the PAA 154 may be any device, component, or server configured to implement a PANA protocol to manage and forward the UE's 110 authentication information. The authentication information may be exchanged between the PAA 154 at the AAA-M 150 and the PAC 114 at the UE 110, via the HG 120, using the session flow 180.

In an embodiment, the AAA server 160 may be any device, component, or server configured to implement an AAA protocol, which defines various mechanisms and policies for authentication, authorization, and accounting. The AAA server 160 may exchange with the UE 110 and the second NAS 144 at the IP Edge 140 authentication and authorization information related to managing the UE's 110 communications with the IP Edge 140. The authentication information may be exchanged via the AAA-M 150 and using RADIUS or DIAMETER (session flows 188 and 184). Additionally, the AAA server 160 may exchange with the UE 110 and the HG 120 authentication and authorization information related to managing the UE's 110 communications with the HG 120. The authentication information may be exchanged via the AAA-M 150 and using RADIUS (session flow 188) and CAPWAP (session flow 186).

In terms of authentication, the AAA server 160 may verify a claimed identity for the UE 110. For instance, the AAA server 160 may establish authentication by matching a digital identity, such as a network address, to a client information database. In other embodiments, the AAA server 160 may match credentials corresponding to the UE 110, such as passwords, one-time tokens, digital certificates, or phone numbers to the client information database.

In terms of authorization, the AAA server 160 may determine if a particular right, such as access to some resource, can be granted to the UE 110. For instance, the AAA server 160 may grant specific types of privileges (including "no privilege") to the UE 110 based on the UE's 110 authentication, the privileges requested by the UE 110, the current system state, or combinations thereof. Authorization may be based on restrictions, for example time-of-day restrictions, physical location restrictions, or restrictions against multiple logins by the UE 110. Granting a privilege may comprise provisioning usage of a certain type of service, such as IP address filtering, address assignment, route assignment, QoS services, bandwidth control, traffic management, tunneling to a specific endpoint, and encryption.

In terms of accounting, the AAA server 160 may track usage or allocation of network resources to the UE 110. The usage information may be used for management, planning, billing, or other purposes. In some embodiments, the AAA server 160 may track real-time accounting information, which may be forwarded by the IP Edge 140 concurrently with the usage or consumption of resources. In other embodiments, such accounting information may be batched, saved, and delivered at a later time to the AAA server 160 by the IP Edge 140. Accounting information may comprise the identity of the UE 110, the nature of the service delivered, the service starting time, and the service ending time.

In an embodiment, the IP network 170 may be any type of network that exchanges IP data packets with the IP Edge 140, the HG 120, and the UE 110. For example, the IP network 170 may be a Packet Switched Network (PSN), an intranet, an Internet, or a local area network (LAN). The IP network 170 may be an Ethernet transport network, a backbone network, an access network, an optical network, a wire-line network, an Institute of Electrical and Electronics Engineers (IEEE) 802 standard network, a wireless network, or any other IP based network.

Figure 2:
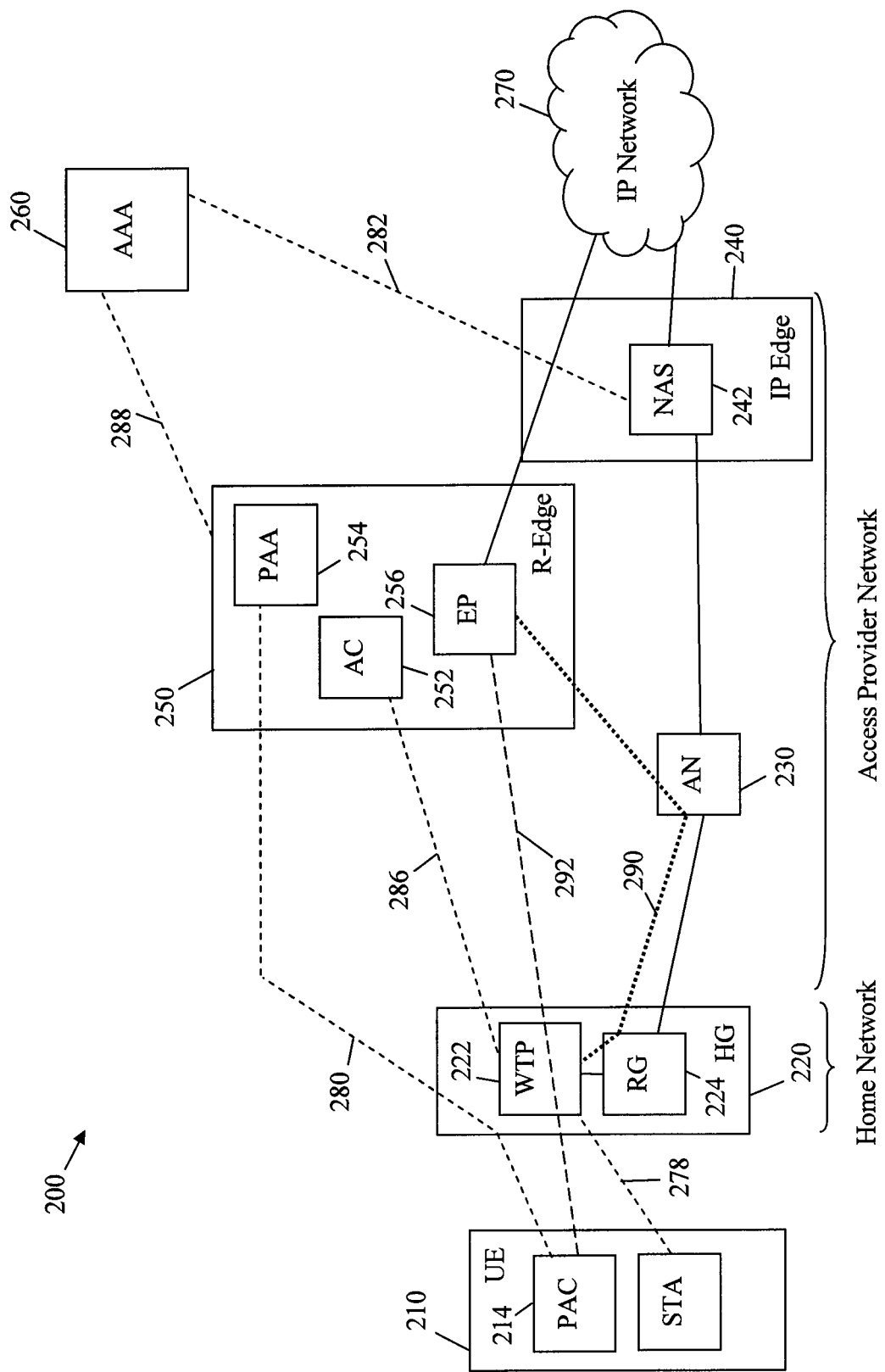
FIG. 2 is a schematic diagram of another embodiment of a fixed network roaming access system.

FIG. 2 illustrates an embodiment of another fixed network roaming access system 200. The fixed network roaming access system 200 may comprise at least one UE 210, a HG 220, an AN 230, an IP Edge 240, a router edge (R-Edge) 250, an AAA server 260, and an IP network 270. In an embodiment, the HG 220 may be a home network or a component of a home network, which may coupled to an access provider network comprising the AN 230 and the IP Edge 240. Additionally, the IP Edge 240 at the access provider network may be coupled to the IP network 270. The UE 210, the HG 220, the AN 230, the AAA server 260, and the IP network 270 may be configured similar to the corresponding components of the fixed network roaming access system 100. Additionally, in FIG. 2, the session flows 278, 280, 282, 286, and 288 between the various components may be configured similar to the corresponding session flows of the fixed network roaming access system 100.

The IP Edge 240 may be configured similar to an IP Edge in standard or access provider networks. For instance, the IP Edge 240 may comprise a single NAS 242, which may be configured similar to the first NAS 142. The R-Edge 250 may comprise an AC 252 configured similar to the AC 152, a PAA 254 configured similar to the PAA 154, and an end point (EP) 256 configured similar to the second NAS 144. As such, the EP 256 may be located with the AC 252 and the PAA 254 at another provider network instead than the IP Edge 240. For instance, the EP 242 may be located at a second provider network in communications with the access provider network comprising the IP Edge 240.

The EP 256 may exchange communications with the HG 220 using a tunnel 290, which may be established between the HG 220 and the R-Edge 250 via the AN 230. The tunnel 290 may be used to forward network setup information, such as IP address assignment information, between the UE 210 to the IP Edge 240. In an embodiment, the tunnel 290 may be a Wi-Fi roaming virtual local access network (VLAN) that may be established between the WTP 222, the RG 224, the AN 230, and the EP 256. The EP 256 may exchange communications with the PAC 214 at the UE 210 using a secure tunnel 292 without trusting the HG 220. In an embodiment, the secure tunnel 292 may be an IPsec that uses IKE to establish secure communications between the UE 210 and the R-Edge 250. Additionally, the EP 256 may be coupled to the IP network 270 via a fixed link. Hence, the UE 210 may communicate with the IP network 270 via the R-Edge 250 using the secure tunnel 292 (between the PAC 214 and the EP 256) and the fixed link (between the EP 256 and the IP network 270).

To establish roaming access for a mobile UE to a fixed or IP network, such as in the fixed network roaming access systems 100 or 200, some of the authentication information related to the UE may be forwarded from the HG to the AAA-M using the PANA. The PANA may be implemented to allow a client, such as the UE, to authenticate itself to an access network, such as the local network comprising the HG, using IP protocols. The PANA protocol may allow the UE to interact with an AAA agent, such as the AAA-M, to gain access without the need to use or implement the particular AAA infrastructure protocols that are in use. The PANA may also allow such interactions to take place without a link-layer specific mechanism for a specific wireless technology. The PANA may provide support for various authentication methods, dynamic service provider selection, and roaming clients.

Specifically, the PANA may be implemented using a PAA and a PAC associated with the UE. The UE may be configured with a temporary network address, such as a temporary IP address, before using PANA. This network address may provide limited accessibility to the UE until establishing authentication using the PAA. Upon successful authentication, the UE may be granted broader network access by either a new network address assignment or enforcement points changing filtering rules for the same network address.

The PANA may authenticate the UE for network access and hence authorize the UE for communications using a secure channel. The PANA may enable establishing the secured channel between the UE and an EP coupled to the network using Internet Protocol Security (IPsec). As such, the packets forwarded between the UE and the network may be protected. The IPsec may use an Internet Key Exchange (IKE) protocol, after successful PANA authentication, to generate encryption and authentication keys, and hence set up a secure IPsec communication session. In other embodiments, the network may comprise security or ciphering at the link layer, and hence no such protocols are needed.

Further, the PANA may enable transporting Extensible Authentication Protocol (EAP) payloads to establish the secure IPsec communication session. The EAP is a universal authentication framework used in wireless networks, such as wireless local access network (WLANs), and Point-to-Point connections. The EAP may provide some common functions and negotiation for a desired authentication mechanism, also referred to as an EAP method, which may be defined by the IKE protocol.

Additionally, some of the authentication information related to the UE may be forwarded from the AC, at the AAA-M or R-Edge, to the HG using CAPWAP. The CAPWAP protocol may be an interoperable protocol between the AAA-M and the HG, which is independent of a specific wireless technology. The CAPWAP protocol may be implemented for a particular wireless technology following the binding requirements defined for that technology. The binding may comprise definitions for technology-specific messages and for technology-specific message elements. The CAPWAP may support a home network or local network comprising a plurality of HGs communicating with the AC via IP based connections. For instance, the CAPWAP protocol may support an IEEE 802.11 Wireless LAN (WLAN) based network comprising the UE and the HG, via IEEE 802.11 binding.

Additionally, some of authentication and authorization information related to the UE may be exchanged between the AAA-M, the AAA server, and the IP Edge using RADIUS. The RADIUS may be used to transport authentication information related to the UE, such as a username and a password. Accordingly, the IP Edge may create an "Access-Request" comprising attributes as the UE's user name, the UE's user password, the identity (ID) of the IP Edge, the Port ID which the UE is accessing, or combination thereof. The Access-Request may then be forwarded to the AAA server that acts as a RADIUS server, for example via the AAA-M. The request may be sent a number of times when no response is returned within a length of time.

The RADIUS server may receive the request and may use a client information database to find the UE identified in the request. The UE entry in the database may comprise a list of requirements, which must be met to allow network access for the UE. The requirements may comprise verification of the password, the IP Edge or port to which the UE is allowed access, or other requirements. If a requirement or condition is not met, the RADIUS server may send an Access-Reject response indicating that the request is invalid. If the requirements or conditions are met, authorization information, such as the list of configuration values for the UE, may be placed into an Access-Accept response. These values may comprise a type of service, such as a serial line Internet protocol (SLIP), a point-to-point protocol (PPP), or a Login User, in addition to other required values for delivering the service. For SLIP and PPP, this may include values such as IP address/subnet mask, Ethernet MAC ID, maximum transmission unit (MTU), desired compression, desired packet filter identifiers, desired protocol, and desired host.

Figure 3:
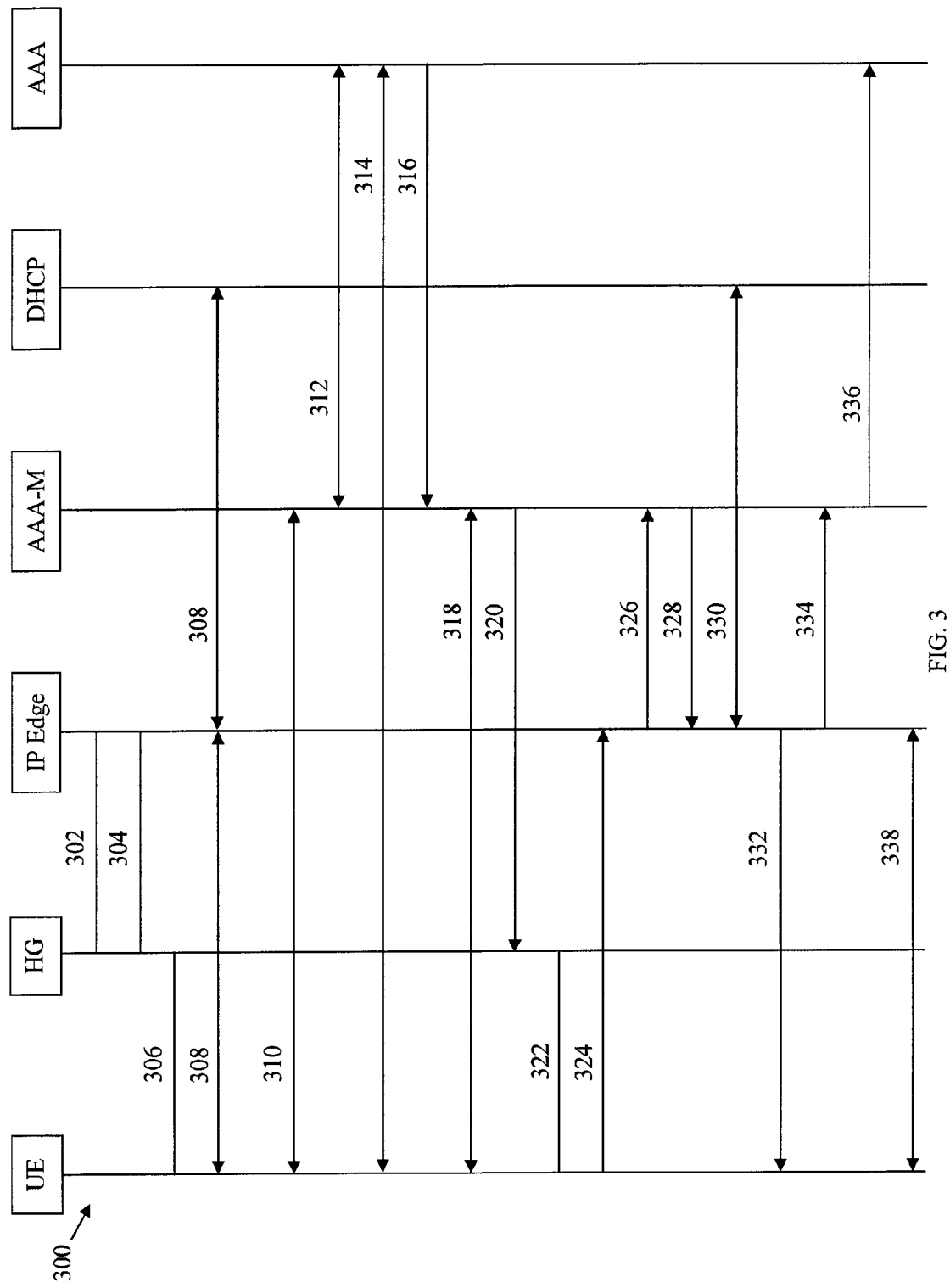
FIG. 3 is a protocol diagram of an embodiment of roaming access method.

FIG. 3 illustrates an embodiment of a roaming access method 300 that provides a mobile UE wireless access to an IP network via an HG at a home network and an IP Edge (or an R-Edge) at an access provider network. Specifically, the method 300 may provide the UE roaming access to the IP network by establishing a secure wireless channel with the HG using PANA but without trusting the HG with its communications with the IP network.

In the method 300, the HG may initially exchange authentication data with the IP Edge (or the R-Edge), and hence establish an IP session 302 with the IP Edge. As such, the HG may establish a tunnel 304 with the IP Edge, such as a Wi-Fi roaming VLAN. In an embodiment, the tunnel 304 may comprise, in addition to the HG and the IP Edge, an AN in communication with the HG and the IP Edge.

When the mobile UE roams within the vicinity of the HG, the UE and the HG may establish a wireless link or wireless association 306, which may be an 802.11 association. Specifically, the UE may establish the wireless association 306 with a WTP at the HG. In an embodiment, after establishing the wireless association 306, the UE may be allowed restricted or limited communications with the HG. For instance, some ports, such as layer two (L2) and layer three (L3) ports, at the HG may be blocked to the UE with the exception of a PANA port and a Dynamic Host Configuration Protocol (DHCP) port. The UE may then request a temporary network address, such as a temporary IP address. For instance, the UE may send a DHCP request 308 to the IP Edge, which may in turn forward the DHCP request 308 to a DHCP server in charge of allocation IP addresses. Specifically, the UE may forward the DHCP request 308 to the IP Edge via the wireless association 306 with the HG. The temporary network address may be used required before using PANA to authenticate the UE and hence establish a communication channel for the UE.

When the UE is allocated a temporary network address from the DHCP server, which may be forwarded via the IP edge and the HG, the UE may initiate a PANA messaging sequence 310 with the AAA-M. For instance, the PANA messaging sequence 310 may be initiated using the wireless association 306 between the UE and the HG and a link between the HG and the AAA-M. The PANA messaging sequence 310 may lead to establishing EAP based authentication between the UE and the AAA server via the AAA-M. As such, when the AAA-M exchanges the PANA messaging sequence 310 with UE, the AAA-M may forward an authentication request 312 to the AAA server using RADIUS. Hence, the AAA server may exchange with the UE, for instance via the AAA-M and HG, an EAP sequence 314. As such, the AAA server and the UE may exchange EAP parameters comprising the UE's authentication information.

Upon successful authentication, the AAA server and the UE may derive an MSK. For instance, the MSK may be derived using parameters in the EAP sequence 314 and a secret key. The AAA server may then forward to the AAA-M using RADIUS a reply 316 comprising the MSK, in addition to some authorization parameters regarding UE access. The AAA-M may then exchange a PANA message sequence 318 with the UE to indicate successful authorization. The AAA-M may use the MSK to derive a first Pairwise Master Key (PMK1) and a second Pairwise Master Key (PMK2). The AAA-M may then forward a message 320 to the HG using CAPWAP other Wi-Fi management protocol. The message 320 may comprise the authorization parameters from the AAA server in addition to PMK1.

The UE may also use the MSK to derive the same PMK1 and PMK2 at the AAA-M. Thus, the UE may share PMK1 with the HG. The UE and the HG may then use the shared PMK1 and an IEEE 802.11i protocol to implement a four-way (4-way) handshake or exchange to establish a secure wireless link channel 322, for instance a secure 802.11 channel, with the HG. In an embodiment, the UE and the HG may each use the PMK1 to derive a first Pairwise Transient Key (PTK1), which may be used to establish the secure wireless link channel using the 802.11i 4-way exchange.

Next, the UE may forward an IP address request 324, such as a DHCP request, to the IP Edge to obtain an IP address for accessing the IP network. The IP address request 324 may be forwarded to the IP Edge via the HG and the tunnel 304 (Wi-Fi roaming VLAN tunnel). The IP Edge may then forward an authorization request 326 to the AAA-M using RADIUS to obtain authorization for the UE. In an embodiment, the IP Edge may forward directly any authorization request received via the tunnel 304 to the AAA-M, without processing the authorization request. The authorization request 326 may comprise UE connection identification information such as the UE's Media Access Control (MAC) address, a Line ID, a VLAN ID, or combinations thereof.

The AAA-M may use the connection identification information to verify the identity of the UE, and may authorize the UE's connection. In an embodiment, the AAA-M may communicate with the AAA server to identify the UE. Hence, the AAA-M may forward an authorization reply 328 using RADIUS to the IP Edge. The authorization reply 328 may comprise connection authorization information related to the UE in addition to the PMK2. Thus, the IP Edge may share the PMK2 with the UE. The IP Edge may then exchange a DHCP request and response 330 with the DHCP server and obtain an IP address allocated to the UE. Additionally, the IP Edge may bind the received authorization from to the AAA-M to the allocated IP address. Next, the IP edge may forward a DHCP response 332 comprising the allocated IP address to the UE.

The IP Edge may then forward a first Accounting Start message 334 to the AAA-M using RADIUS. The first Accounting Start message 334 may be used to signal the AAA-M that a communication session may be about to start between the UE and the IP network. Additionally, the IP Edge may forward the allocated IP address to the AAA-M with the first Accounting Start message 334. In turn the AAA-M may forward a second Accounting Start message 336 to the AAA server, which may include the allocate IP. As such, the AAA server may begin accounting for the UE's roaming access connection usage.

In an embodiment, the IP Edge may receive from the AAA server via the AAA-M, or from the AAA-M, accounting policy information related to the UE using RADIUS. For instance, the IP Edge may receive the accounting policy information in addition to the connection authorization information in the authorization reply 328. As such, the IP Edge may police the UE's roaming access connection usage, while accounting for the connection usage may be handled separately by the AAA server. The IP Edge may use the allocated IP address, which may be bounded to the accounting policy information, to identify and police the UE connection usage. Similarly, the AAA server may use the allocated IP address to identify and account for the UE connection usage.

When the UE receives the DHCP response 332 comprising the allocated IP, the UE and the IP Edge may establish a secure IP tunnel 338, such as an IPsec using IKE. In an embodiment, the UE and the IP Edge may each use the shared PMK2 to derive a second Pairwise Transient Key (PTK2), which may be used to establish the secure IP tunnel 338 without trusting the HG.

When the roaming UE leaves the vicinity of the HG, the secure wireless link channel 322 between the UE and the HG is disconnected. Accordingly, accounting and policing the UE's roaming access connection usage may be terminated. The IP Edge may be informed, for example by the HG, that the secure wireless link channel 322 is disconnected. Hence, the IP Edge may remove or discard the UE's authorization and policy information, including the PMK2 and the PTK2. Additionally, the AAA server may be informed, for example by the IP Edge or the AAA-M, that the secure wireless link channel 322 is disconnected. Hence, the AAA server may stop accounting for the connection usage. In an embodiment, stopping the accounting for the connection usage at the AAA server may trigger a CAPWAP sequence to the HG, for example by the AAA-M, that results in removing the PMK1 and the PTK1 in addition to other authentication information related to the UE.

Figure 4:
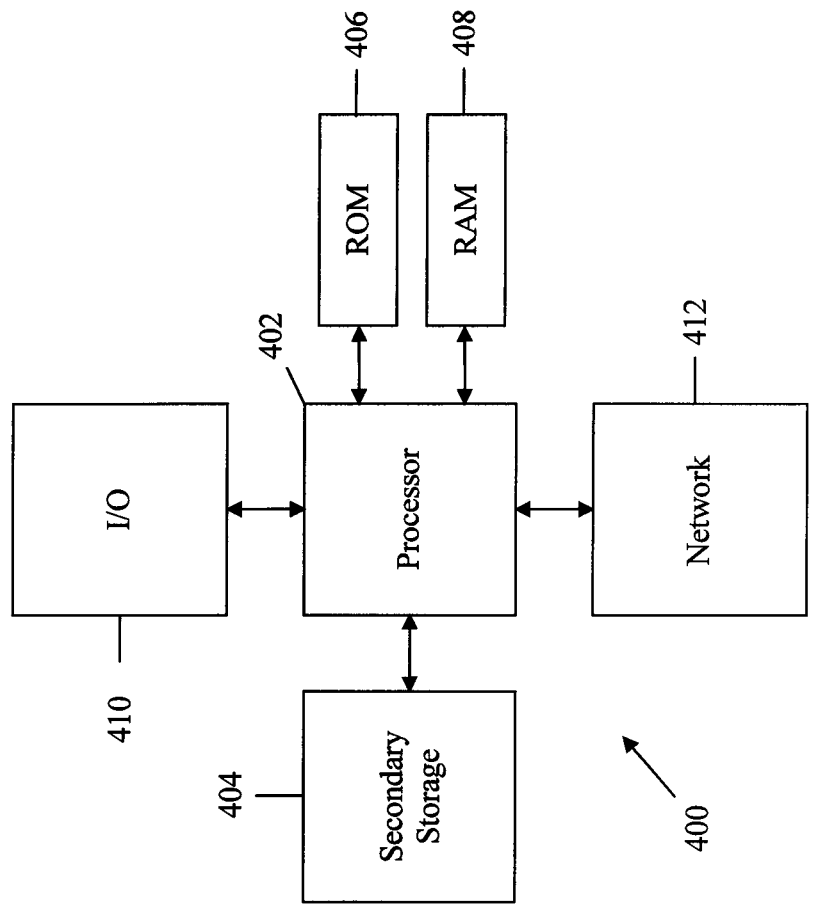
FIG. 4 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a memory comprising computer readable instructions that when implemented by a processor cause the processor to:
derive a Master Session Key (MSK) using a secret key and at least one parameter obtained from an Extensible Authentication Protocol (EAP) sequence;
derive a first Pairwise Master Key (PMK) and a second PMK from the MSK;
establish a first authentication between a user equipment (UE) and a home gateway (HG) using the first PMK, wherein the first authentication allows the establishment of a first secure tunnel that extends between the UE and the HG; and
establish a second authentication between the UE and an end point using the second PMK,
wherein the second authentication allows the establishment of a second secure tunnel that extends between the UE and the end point and through the HG,
wherein the end point is not part of the HG,
wherein the HG and the end point are located in separate nodes,
wherein the HG does not have access to the second PMK or any encryption keys derived therefrom,
wherein communications are exchanged between the UE and the end point over the second secure tunnel via the first secure tunnel with the HG,
wherein the communications are encrypted/decrypted for the second secure tunnel using an encryption key derived from the second PMK,
wherein the communications are further encrypted/decrypted for the first secure tunnel using an encryption key derived from the first PMK, and
wherein by virtue of not having access to the second PMK or any encryption keys derived therefrom, the HG cannot completely decrypt the encrypted communications.

2. The network component of claim 1, wherein the first PMK is sent to the HG and the second PMK is sent to the end point using a protocol for carrying authentication for network access (PANA).

3. The network component of claim 1, wherein establishing the first authentication between the UE and the HG comprises an 802.11 wireless link exchange.

4. The network component of claim 3, wherein the 802.11 wireless link exchange is performed with a wireless termination point (WTP) at the HG.

5. The network component of claim 1, wherein establishing the second authentication between the UE and the end point comprises an Internet Key Exchange (IKE).

6. The network component of claim 5, wherein the end point is part of an Internet Protocol (IP) Edge.

7. The network component of claim 1, wherein the second PMK cannot be derived from the first PMK.

8. The network component of claim 7, wherein the first PMK cannot be derived from the second PMK.

9. A method comprising:
receiving a Master Session Key (MSK);
deriving a first Pairwise Master Key (PMK) and a second PMK from the MSK;
sending the first PMK to a home gateway (HG); and
sending the second PMK to an end point, but not to the HG,
wherein the first PMK is used for establishing a first authentication between a user equipment (UE) and the HG,
wherein the first authentication allows the establishment of a first secure tunnel that extends between the UE and the HG,
wherein the second PMK is used for establishing a second authentication between the UE and the end point,
wherein the second authentication allows the establishment of a second secure tunnel that extends between the UE and the end point and through the HG,
wherein the HG and the end point are located in separate nodes,
wherein the HG does not have access to the second PMK or any encryption keys derived therefrom,
wherein communications are exchanged between the UE and the end point over the second secure tunnel via the first secure tunnel with the HG,
wherein the communications are encrypted for the second secure tunnel by the UE and decrypted by the end point using an encryption key derived from the second PMK,
wherein the communications are encrypted for the first secure tunnel by the UE and decrypted by the HG using an encryption key derived from the first PMK, and
wherein by virtue of not having access to the second PMK or any encryption keys derived therefrom, the HG cannot completely decrypt the encrypted communications.

10. The method of claim 9, wherein the first PMK is sent using a Control and Provisioning of Wireless Access Points (CAPWAP).

11. The method of claim 9, wherein the second PMK is sent using Remote Authentication Dial In User Service (RADIUS) or DIAMETER, and wherein the end point is part of an Internet Protocol (IP) Edge.

12. The method of claim 9, wherein the MSK is received using Remote Authentication Dial In User Service (RADIUS) or DIAMETER.

13. The method of claim 9, wherein the second PMK cannot be derived from the first PMK.

14. The method of claim 13, wherein the first PMK cannot be derived from the second PMK.

* * * * *